(12) United States Patent
Rosenthal et al.

(10) Patent No.: US 6,922,965 B2
(45) Date of Patent: Aug. 2, 2005

(54) BONDED INTERLOCKING FLOORING

(75) Inventors: Guy Rosenthal, Wheaton, IL (US); Jamie Heisserer, DesPlaines, IL (US); Victoria L. Stolarski, Georgetown, TX (US); Paul T. Perrine, Killeen, TX (US)

(73) Assignee: Ilinois Tool Works Inc., Glenview, IL (US)

(*) Notice: Subject to any disclaimer, the term of this patent is extended or adjusted under 35 U.S.C. 154(b) by 0 days.

(21) Appl. No.: 10/626,912

(22) Filed: Jul. 25, 2003

(65) Prior Publication Data

US 2005/0016107 A1 Jan. 27, 2005

(51) Int. Cl.[7] .................................................. E04B 2/32
(52) U.S. Cl. ....................... 52/592.1; 52/515; 156/304.5
(58) Field of Search ..................................... 52/592.1, 515, 52/516, 741.3, 741.4; 156/307.1, 307.5, 331.2, 337.6, 304.1, 304.5, 331.6

(56) References Cited

U.S. PATENT DOCUMENTS

| | | |
|---|---|---|
| 1,895,194 A | 1/1933 | Kutzner et al. |
| 2,726,222 A | 12/1955 | Palmquist et al. |
| 2,817,620 A | 12/1957 | Golick et al. |
| 2,875,101 A | 2/1959 | Ehrlich |

(Continued)

FOREIGN PATENT DOCUMENTS

| | | |
|---|---|---|
| WO | WO 03/031750 A1 | 4/2003 |
| WO | WO 03/061967 A1 | 7/2003 |

*Primary Examiner*—Naoko Slack
(74) *Attorney, Agent, or Firm*—Fletcher Yoder

(57) ABSTRACT

The present technique relates to a floor system that includes panels designed to be joined to one another, with an adhesive coating and a sealant at each joint to facilitate assembly. The panels include mechanically interlocking portions that mate when the system is installed. Disposed on the interlocking portions is a coating adapted to cohesively bond upon contact with itself under ambient conditions and without external activation. The sealant protects the joint and prevents the ingress of moisture following installation. Advantageously, the cohesive bonding of the coating is delayed such that the bonding does not obstruct the installation of the floor panel.

34 Claims, 4 Drawing Sheets

U.S. PATENT DOCUMENTS

| | | |
|---|---|---|
| 3,015,572 A | 1/1962 | Casey et al. |
| 3,579,941 A | 5/1971 | Tibbals |
| 3,592,717 A | 7/1971 | Gaughran |
| 3,743,618 A | 7/1973 | Haruhiko et al. |
| 3,756,635 A | 9/1973 | Beers |
| 3,969,564 A | 7/1976 | Carder |
| 4,095,990 A | 6/1978 | Konigsberg |
| 4,355,073 A | 10/1982 | Knightley |
| 4,536,524 A | 8/1985 | Hart et al. |
| 4,635,418 A | 1/1987 | Hobgood |
| 4,649,077 A | 3/1987 | Lauchenaer |
| 4,681,477 A | 7/1987 | Fischer |
| 4,910,048 A | 3/1990 | Sinclair |
| 5,085,930 A | 2/1992 | Widmann et al. |
| 5,185,193 A | 2/1993 | Phenicie et al. |
| 5,204,149 A | 4/1993 | Phenicie et al. |
| 5,238,721 A | 8/1993 | Nakazawa |
| 5,259,686 A | 11/1993 | Hatch |
| 5,271,766 A | 12/1993 | Koutlakis et al. |
| 5,288,358 A | 2/1994 | Logan |
| 5,343,665 A | 9/1994 | Palmersten |
| 5,448,865 A | 9/1995 | Palmersten |
| 5,609,941 A | 3/1997 | Cawthon |
| 5,658,086 A | 8/1997 | Brokaw et al. |
| 5,660,492 A | 8/1997 | Bathon |
| 5,830,948 A | 11/1998 | Frechet et al. |
| 5,954,447 A | 9/1999 | Bathon |
| 6,029,416 A | 2/2000 | Andersson |
| 6,042,930 A | 3/2000 | Kelch et al. |
| 6,194,064 B1 | 2/2001 | Keely et al. |
| 6,233,896 B1 | 5/2001 | Coup |
| 6,314,701 B1 | 11/2001 | Meyerson |
| 6,326,073 B1 | 12/2001 | Sager et al. |
| 6,357,197 B1 | 3/2002 | Serino et al. |
| 6,375,872 B1 | 4/2002 | Chao |
| 6,432,551 B1 | 8/2002 | Brodeur, Jr. et al. |
| 6,438,919 B1 | 8/2002 | Knauseder |
| 6,565,919 B1 | 5/2003 | Hansson et al. |
| 6,588,166 B2 * | 7/2003 | Martensson et al. .......... 52/578 |
| 2001/0009704 A1 | 7/2001 | Luhmann et al. |
| 2002/0025399 A1 | 2/2002 | Sager et al. |
| 2002/0046526 A1 | 4/2002 | Knauseder |
| 2002/0114914 A1 | 8/2002 | Chen et al. |
| 2002/0127374 A1 | 9/2002 | Spratling |
| 2002/0148551 A1 * | 10/2002 | Knauseder .................. 156/182 |
| 2003/0024199 A1 * | 2/2003 | Pervan et al. .............. 52/589.1 |
| 2003/0141004 A1 * | 7/2003 | Palmblad et al. ............. 156/64 |

* cited by examiner

BONDED INTERLOCKING FLOORING

FIELD OF THE INVENTION

The present technique relates to floor paneling. More particularly, the present technique relates to cohesively bonding floor panels having interlocking portions.

BACKGROUND OF THE INVENTION

Floors made from natural materials, such as wood and stone, continue to be an attractive option for many homeowners, building designers and architects. In many instances, homes and other buildings with wood- and stone-look floors command higher values than those with carpeting or vinyl flooring. Unfortunately, stone and solid wood floors are sensitive to scratching, difficult to maintain and relatively expensive and, as such, outside the means of many consumers. A demand for floors with the appearance of the higher cost natural materials, however, remains. In response to this demand, the flooring industry provides what are commonly known as laminate floors.

Traditional laminate floors are comprised of a surface laminate layer, a substrate, and a backer laminate layer. For example, the surface laminate layer may comprise a decorative sheet sandwiched between a structural layer and a protective layer. In turn, the surface laminate layer may then be bonded to a wood/resin composite substrate, such as particle board or fiberboard. The substrate is additionally bonded to a backing laminate layer that imparts balance and flatness to the total flooring composite. Because the decorative sheet in the surface laminate layer can be printed to almost identically mimic the appearance of natural wood and stone, the appearance of a solid wood or stone floor can be achieved at a cost more affordable to consumers and builders. Additionally, the surface laminate layer is much more resistant to scratching, and other abuse and thus is easier to maintain.

To form a high-pressure surface laminate, a thin overlay sheet impregnated with melamine resin and aluminum oxide grit to provide abrasion resistance, is layered on top of a decorative sheet. The decorative sheet is then layered on top of one or more kraft paper layers that have been impregnated with phenolic resin. The layered materials are then placed into a high-pressure press where they are cooked at approximately 300° F. under approximately 1000 psi for fifteen to sixty minutes. During the cooking process, the B-staged melamine and phenolic resins will flow and crosslink to bond these layers, thereby forming the surface laminate. Similarly, the high-pressure backer laminate is made by layering one or more kraft paper sheets that have been treated with phenolic and/or melamine resin and then cooking the materials in a high pressure press. Subsequently, the surface and backer laminates may then be adhesively bonded to the opposing sides of the wood/resin substrate, thereby forming a laminate panel that can then be machined into flooring.

In addition to laminate flooring made with high-pressure laminates, there is laminate flooring made with direct-pressure laminates. A direct-pressure surface laminate is made by either impregnating the decorative sheet with melamine resin containing aluminum oxide grit, or layering a melamine impregnated overlay sheet on top of a decorative sheet that may or may not be impregnated with melamine resin it self. These B-staged materials are laid directly onto a wood/resin substrate. Similarly, B-staged overlay and/or kraft paper sheets that have been treated with melamine and/or phenolic resin are layered on the opposing side of the wood/resin substrate. In contrast to the laminate flooring made with high-pressure laminates, the direct-pressure laminate components and the substrate are then pressed together at approximately 300° F. under 200–400 psi of pressure for one to ten minutes. The resulting panel can then be machined into direct-pressure laminate flooring.

A considerable portion of the total expense associated with the natural flooring products can be the costs associated with installation. Indeed, installation of hardwood, stone or laminate flooring can be a time consuming and laborious process. Procedurally, in the case of laminate flooring, each individual plank is properly positioned and subsequently secured to an adjacent piece. To secure the pieces against separation, an adhesive is typically applied to the abutting surfaces between each adjacent panel piece. The installer must use professional judgment in determining the amount of adhesive to apply. If too much adhesive is applied, then, upon assembly, any excess adhesive may be driven from the voids between the abutting surfaces and onto the decorative surface. This problem is generally referred to in the flooring industry as "squeeze out". In many instances, the "squeeze out" adhesive is difficult to remove from the laminate surface and the installer often damages the laminate layer trying to do so. However, if too little adhesive is employed, then the bond between the panel pieces may lack adequate strength. For example, if the abutting surfaces of the adjacent pieces are not adequately coated with adhesive, this, in turn, may lead to unwanted separation and movement of the pieces throughout the lifetime of the floor.

Installers in the industry have employed a number of types of adhesives in assembling floors. Most commonly, installers have employed what are known as evaporative adhesives. Adhesives of this type are placed on the abutting surfaces of adjacent panel pieces in a wet or liquid state. Once applied, the coated surfaces are brought into intimate contact with one another. Over time, the solvent material evaporates leaving only the bonded solid or adhesive base, thereby binding the abutting surfaces of adjacent pieces. This type of adhesive, however, may be unwieldy to apply. As stated above, "squeeze out" can affect the laminate surface. Moreover, the curing time of evaporative adhesives may render the assembled floor unusable for 24 hours or more. Typically, when the evaporative adhesive employs water as a solvent, the water penetrates and swells the fiberboard core resulting in unsightly raised or "peaked" seams. One advantage, however, of the evaporative adhesive is that once the adhesive is fully cured or dried, it acts also as a sealant by coating the wood/resin composite core and repelling water from the seam between panels.

Another adhesive type may be a binary reaction or two-component adhesive. In employing a reaction adhesive, one of the abutment surfaces of a panel is generally pre-lined with a first compound and the opposite abutment surface of the adjacent panel is pre-lined with another compound. When separate, neither compound is an adherent nor presents tacky characteristics. However, when the two distinct compounds are brought into contact with one another, a chemical reaction occurs and the two distinct compounds form a single compound having tacky or adhesive properties. The requirement of two separate compounds and the fact that these compounds must be maintained separate prior to installation can add to the costs of manufacture as well as to the costs of storage.

The installer may also employ adhesives which require activation. In this case, the activation adhesive is typically in a dormant state (i.e. dry and non-tacky) when initially presented. However, the adhesive may be activated (i.e. rendered tacky) at a desired time. The adhesive may be activated in various ways, such as by rehydration, exposure to an ultraviolet light source, radio-frequency, or application of high pressure or heat. In any event, to use such systems the installer is required to perform the additional step of activating the adhesive before binding the two pieces. Moreover, the activation may require additional equipment, typically purchased at the expense of the installer.

Some manufactures have attempted to move away from the adhesive bonding modality all together. Essentially, these manufacturers fabricate panels having mechanical methods of securing adjacent floor panels. For example, two of the four sides of each panel are generally machined to form a groove running the length of a given side. The remaining two sides are machined to present tongues corresponding to, and designed to interlock with, the aforementioned grooves. However, the absence of an adhesive may render this "glueless" flooring system susceptible to moisture and water damage, and may permit some degree of separation of the panels. That is, if there is a separation between adjacent flooring panels, the lack of a protective adhesive provides an unrestricted moisture path into the wood/resin composite core. The ingress (and subsequent regress) of moisture into the wood/resin composite core may then cause floor panels to grow or shrink, respectively. Without an adhesive to seal the fiberboard core, the fiberboard would be more likely to dehydrate when in conditions of low humidity. As a result the flooring panel will shrink leading to a visually detectable and objectionable gap. Additionally, the moisture ingress can lead to swelling of the fiberboard core that is also visually objectionable to the customer.

To combat the moisture sensitivity of the glueless laminate flooring, many manufactures apply a sealant to the exposed edges of the panels during the manufacturing process. These sealants typically comprise a wax, oil or a coating, such as polyurethane. Unfortunately, these sealants do not improve the binding strength between the mechanically interlocked panels.

Accordingly, there exits a need for flooring systems that address many of the issues discussed above.

SUMMARY OF THE INVENTION

The present invention provides a floor system designed to respond to such needs. In accordance with one aspect of the invention, the floor system includes first and second layered members. Each layered member includes a surface layer; and a core layer coupled to the surface layer. The core layer includes an integral latching portion disposed on a first side of the core layer and an integral securing portion disposed on a second side of the core layer. The latching and securing portions are configured to mate interlockingly with respect to one another. An adhesive coating is disposed on at least one of the latching and securing portions of the respective first and second layered members. A sealant is disposed to at least one of the latching and securing portions of the respective first and second layered members to inhibit the ingress of moisture.

The coating may be disposed on both layered members, and may include an adhesive which adhesively bonds to the layered members, and cohesively bonds to itself without the need to rewet or otherwise activate the coating. The sealant may be applied along the length of the layered members along which the coating is applied. In one embodiment, the coating may include a PVA adhesive. The sealant may be applied between the coating and one or more surface, such as the upper and lower surfaces of the layered members. The layered members themselves may include a substrate and a laminate disposed on the substrate to provide a desired decorative appearance.

The invention also provides a method for manufacturing a floor system of the type discussed above.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
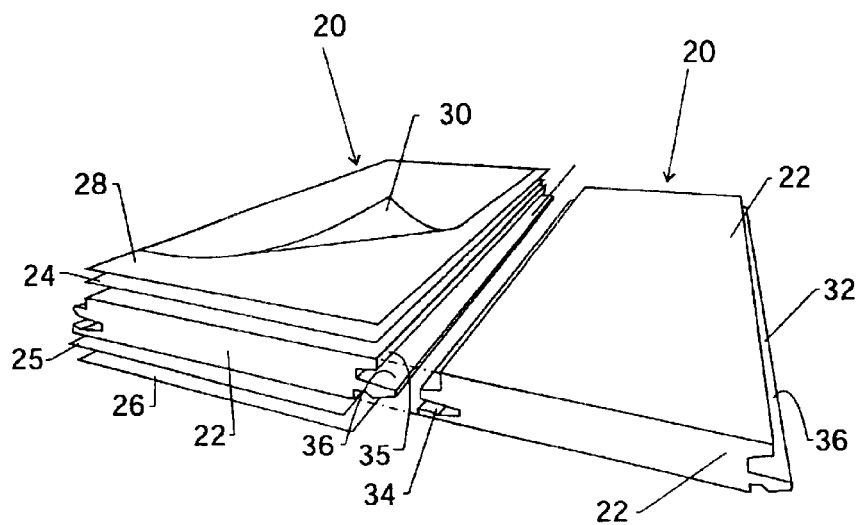
FIG. 1 is a perspective view of exemplary floor panels shown just prior to engagement, wherein one of the floor panels is illustrated, in an exploded view, as having a plurality of layers disposed about a central core layer.

Referring generally to FIG. 1, a pair of adjacent laminate wood floor panels 20 are illustrated at a point in time just prior to engagement. It is worth note that although the present technique is described in relation to laminate floor panels, the present technique may be applied to other floor panel modalities as well. For example, the present technique may also be applied to solid hardwood floors. In the exemplary embodiment, the floor panel 20 comprises a wood/resin composite core layer 22. The core layer 22 may be a high-density fiberboard which, advantageously, provides structural integrity to the laminate floor. However, the wood/resin composite may also comprise, for example, medium density fiberboard (MDF), particle board, fiberboard or wood plastic composites. Advantageously, a wood/resin composite core layer 22 is typically significantly less expensive than a solid wood core.

Disposed directly above and below the core layer 22 may be phenolic treated kraft sheets 24 and 25. These kraft sheets 24, 25 may provide additional impact and dent resistance. Continuing with the layers of the described floor panel 20, disposed underneath lower-most kraft layer 25 on the underside of the wood/resin substrate may be a balancing layer 26. Advantageously, the balancing layer 26 assists in keeping the assembled floor panels 20 flat prior to and after installation. Disposed above the upper kraft layer 24 may be a decorative sheet 28. The decorative sheet 28 may be fashioned so as to provide any desired final appearance, such as patterns that simulate wood or natural stone, logos, or custom designs. To protect the decorative layer 28, a wear layer 30 may be disposed thereover. The wear layer 30, such as a melamine formaldehyde impregnated paper sheet, advantageously protects against scuffs, stains and fading. Of course, additional layers, such as sound deadening or cushioning layers, may be provided, depending upon the individual environments in which the panel 20 is to be installed. Additionally, those in the industry may, for example, refer to the subassembly of the decorative sheet, once bonded with the protective sheet 30 and kraft paper sheet 24, as a decorative or surface laminate layer. The subassembly of the balancing layer 26 and kraft layer 25 are referred to as the backer laminate layer.

Focusing on the lateral edges of the core layer 22, in the illustrated embodiment each core layer 22 comprises an edge having a latching portion 32 as well as an opposite edge having a correspondingly profiled securing portion 34. As discussed further below, the latching portion 32 and the securing portion 34 are configured so as to interlockingly secure adjacent floor panels 20 together. Specifically, upon engagement of adjacent panels 20, the latching and securing portions 32 and 34 are configured to mechanically secure the two adjacent panels together. Additionally, as also further discussed below, a layer of sealant 35 as well as a cohesively bonding coating 36 may be disposed over segments of the latching and securing portions 32 and 34 to provide for resistance to moisture and to increase the binding strength between the two pieces.

It should be noted that, while reference is made to two mating edges of the panels in the present discussion, in practice the panels will typically have four such edges, all of which may be profiled and all of which may receive a coating that adheres to the panel and cohesively bonds to itself when the panels are mated. In particular, for floor panels having conventional elongated rectangular shapes, shorter end edges are preferably similarly profiled and coated to prevent "gapping" between panels joined along their end edges. Generally, however, the coating and sealant, as described below, may be applied to some or all of the edges of the floor panels to enhance retention of the panels following installation and to facilitate the installation process.

It should also be noted that, as used herein, the term "interlocking" (or its cognates) denotes mechanical engagement in which mutually opposed surfaces interact to oppose separation. Thus, panels that interlock, while not providing the enhanced retaining force of the present technique, would not generally become easily separated, as might panels engaged by simple tongue and groove profiles. It is to be understood that there need not be any residual stress or strain in the mating components when interlocked and installed, although such systems as well may benefit from the present techniques.

Figure 2:
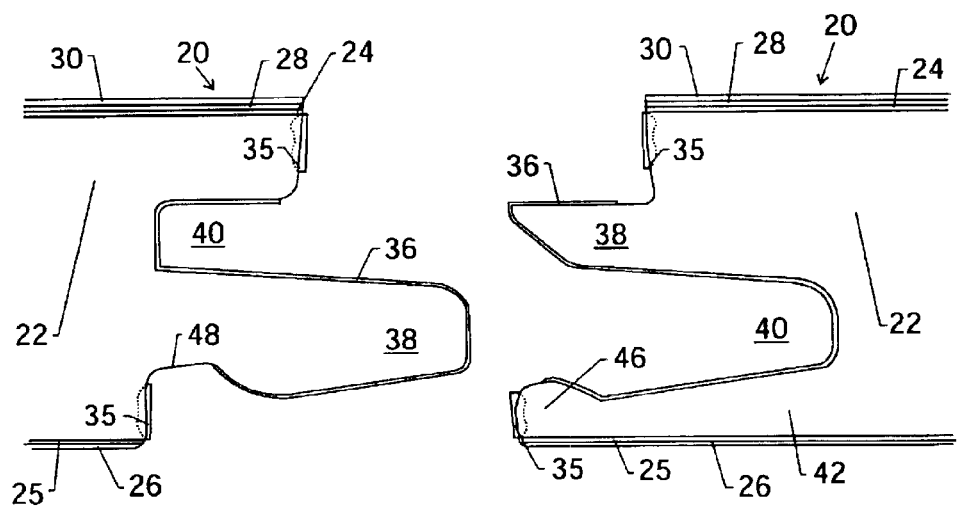
FIG. 2 is a detail side view of exemplary interlocking latching and securing portions of two exemplary adjacent floor panels shown just prior to engagement, each panel section shown with adhesive and sealant coatings disposed on mating surfaces.

FIG. 2 illustrates a detailed view of the respective latching and securing portions 32 and 34 of the adjacent floor panels 20 introduced in FIG. 1 prior to mating engagement. In the illustrated embodiment, the latching and securing portions 32 and 34 comprise correspondingly shaped tongue 38 and groove 40 sections. Advantageously, these corresponding tongue 38 and groove 40 sections are configured to interconnect with and contact one another, at least partially. Disposed on the securing portion 34 of the core layer 22 is a lower flange 42. The flange 42 works in conjunction with an inclined surface 44 to facilitate engagement of a securing rib 46, disposed on the end of the flange 42, with a locking surface 48 disposed on the underside of tongue 38 of latching portion 32. The engagement of the rib 46 with the locking surface 48 interlocks the two panel pieces, thereby mechanically increasing the binding between the panel pieces.

Disposed on the surface of the latching portion 32 and the securing portion 34, may be the sealant 35 and coating 36. The exemplary sealant 35 and coating 36 may be applied to a substantial length of the respective latching and securing portions 32 and 34, or along their entire length, or may be applied to only a small segment. Once applied, the sealant 35 may seep into the wood/resin core 22, thereby further protecting the core 22 from moisture penetration. In an effort to control costs, application of the sealant 35 and coating 36 may be limited to strategic areas. For example, as discussed further below, application of the coating 36 may be limited to segments of the corresponding latching and securing portions of the respective panels which are mated and contact one another when the panels are assembled. Similarly, the application of sealant 35 may be limited to areas of the latching and securing portions of the respective panels which are unmated, and particularly along areas adjacent to the upper and lower surfaces that may be exposed to moisture.

It will be appreciated by those in the flooring industry that the sealant 35 may comprise any number of hydrophobic compounds, such as a wax, oil or a polymeric film, such as polyurethane. Additionally, the coating 36 may comprise a substance which adhesively bonds (i.e. bonding of dissimilar materials) to the respective latching and securing portions 32 and 34 of the panels. As discussed in further detail below, the coating 36 of a present embodiment may comprise a polyvinyl acetate (PVA) emulsion suspended primarily in a water solvent. Once the coating 36 has adhesively bonded to the respective latching and securing portions, the coating 36 preferably presents a substantially non-tacky surface.

However, while remaining non-tacky during transport and storage, the coating 36 is nevertheless viscoelastic. Thus, once the coatings 36 of the adjacent panels 20, more particularly the non-tacky surfaces of the coatings 36 disposed over the corresponding portions 32 and 34, are brought into contact with one another, then the coatings 36 of the respective portions 32 and 34 begin to cold flow together. In other words, the coatings 36 cohesively bond (i.e. bonding of similar materials), thereby binding the adjacent panel members 20 together. Over a relatively short timeframe, the coatings 36 cohesively bond as a result of the mere contact induced by the engagement of the adjacent panel members 20. Thus, the coatings 36 cohesively bond under ambient conditions, i.e. the coatings 36 need not be activated by, for example, re-wetting, exposure to heat, exposure to ultra-violet light, exposure to electromagnetic energy, application of high-pressure forces or other stimuli. An exemplary coating 36 may be Formula X327 available from Franklin International of Columbus, Ohio. In a present embodiment, a single adhesive is used for all areas so coated, thereby facilitating manufacture and installation.

In the present context, a distinction is made between "adhesion" of the coating to the underlying substrate of the floor panels, and "cohesion" of the coating during assembly. In particular, as used herein, the term "adhesion" (or its cognates) denotes the molecular force of attraction in the area of contact between unlike bodies. When the coating is a PVA emulsion carried by a water solvent, for example, the carrier permits the adhesive to penetrate in to the substrate where it adhesively bonds. The term "cohesion" (and its cognates), on the other hand, denotes the molecular force between particles within a body or substance that acts to unite them. Thus, the coating on either panel in the present context bonds to the like coating on joined panels by cohesion. Similarly, the term "non-tacky" as used herein denotes a surface quality of the coating by which its adhesion to foreign objects (e.g. dust, debris, paper, cloth, wood chips, etc.), upon drying after application, is diminished.

When adjacent panels 20 are in the disengaged position, as shown in FIG. 2, the surfaces of coatings 36, as discussed above, may be substantially non-tacky. Because of the non-tacky characteristics of the coatings, the coatings 36 resist against the inadvertent adhesion of the panel pieces to other structures or to debris. For example, if a panel is placed against a wall, the installer need not be as concerned that the coating will inadvertently adhesively bond the panel to such wall.

Also, advantageously, the exemplary coatings 36 may not bond immediately upon initial engagement, thereby allowing the installer to make adjustments subsequent to engagement. For example, the installer may adjust the lateral position of the engaged panels with respect to one another. Accordingly, the coating coats and smoothes the rough fibers of the cut MDF and, as such, the coating 36 can be considered to provide a sliding interface to the interlockingly configured portions 32 and 34 during engagement.

Figure 3:
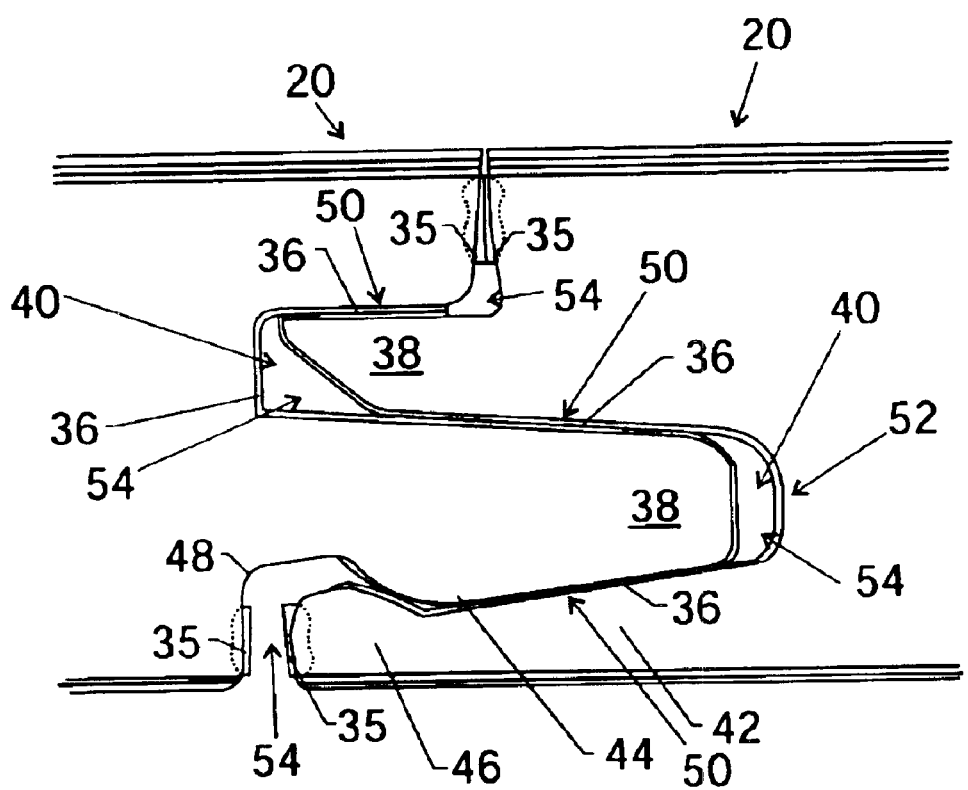
FIG. 3 is a detail side view of the latching and securing portions as illustrated in FIG. 2, FIG. 3 illustrating the floor panels in the engaged position.

Referring next to FIG. 3, upon full engagement of the panels 20, the coatings 36 disposed on the corresponding latching 32 and securing 34 portions begin to cohesively bond. At a molecular level, the intermolecular Van der Waals forces cause the molecules of the coatings 36 to adhere to one another. In other words, as the similar coatings 36 disposed at contacting locations on each of the panels 20 come into contact with one another, the coatings 36 begin to cold flow and bond to one another, thereby binding the panels 20. Over time, the bond will strengthen and, as such, assist the mechanical engagement between the latching and securing portions. In tests of the present technique, it has been found that the separation or tensile strength of the foregoing coating 36, in conjunction with the interlocking portions 32 and 34, may be three to five times the stronger than that of the interlocking portions 32 and 34 alone (i.e., resulting from mechanical retaining forces only). Moreover, in tests of the present system, the coating is expected to flow for approximately between 2 and 3 hours begin to join cohesively within twenty-four hours. Thereafter, bonding forces increase with the time of contact, providing a tensile strength of approximately 100 lb/inch of width within 96 hours after assembly, and a tensile strength of approximately 200 to 300 lb/inch of width following a full set period of approximately 3 months.

Additionally, upon full engagement of the panels 20 of the illustrated embodiment, certain segments of the latching and securing portions 32 and 34 may not be in surface contact with one another. Accordingly, segments of the respective portions 32 and 34 which come into contact with corresponding portions may be referred to as mated segments 50 (see FIG. 3). In contrast, segments of portions 32 and 34 which do not come into contact with their corresponding portions may be referred to as unmated segments 52. In a present embodiment, the unmated segments 52 may define voids 54 formed between the engaged panels 20.

In an effort to control costs, application of the sealant 35 and the coating 36 may be limited to strategic segments of the respective portions. For example, in the illustrated embodiment, application of the coating 36 maybe limited to the mated segments 50 of the tongues and grooves 38 and 40 respectively. To control costs further, the application of the coating may be further limited to the mated segments 50 of the largest or primary tongue 38 and largest groove 40.

Similarly, to prevent the ingress of water or moisture into the wood/resin composite core 22, the sealant 35 may also be applied to strategic segments of the latching and securing portions 32 and 34. For example, the sealant 35 may be applied to portions of the surfaces which might come into contact with moisture or other contaminants, such as adjacent to upper and lower surfaces of the panels. Because of the flush fit of tongues 38 and grooves 40 and addition of coating 36, the flow of moisture downstream of the mated segments 50 is retarded. As such, although it may be generally preferable to bracket or shield the coating on top and bottom sides, the application of sealant 35, again to reduce cost, may be limited to segments upstream (from the point of view of the moisture flow from the top and bottom surfaces) of the mated segments 50 on which adhesive is applied.

Figure 4:
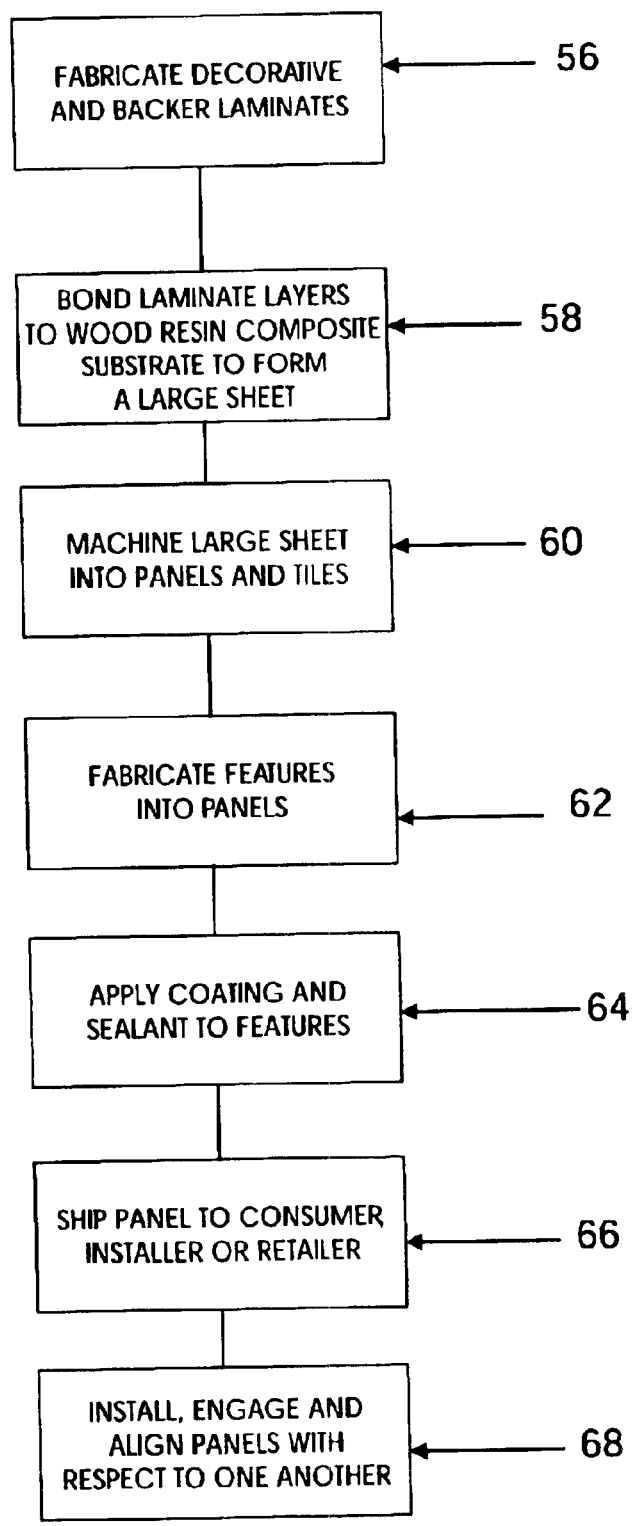
FIG. 4 is flow chart representing an exemplary sequence beginning with the manufacture of an exemplary floor panel and concluding with the installation of a plurality of floor panels.

Turning next to FIG. 4 while keeping FIG. 2 in mind, FIG. 4 is a flow chart representing various stages in the manufacture and installation of the exemplary panels 20. Beginning with the first step, represented by block 56, large sheets of laminate may be produced. By compressing, for example, a decorative sheet 28 between a phenolic resin impregnated layer 24 and a protective melamine resin impregnated layer 30, in conjunction with a heat source, a bonded surface or decorative laminate layer may be formed. Temperatures of approximately 300° F. in conjunction with pressures of about 1000 psi are generally sufficient for the purposes of forming the laminate. Similarly, the layers 24 and 26 which have been impregnated with phenolic and/or melamine resin, are pressed to generate a backer laminate.

Block 58 represents the next step which may comprise the bonding of the laminate layers to the wood/resin composite substrate or core 22. Any number of conventional methods may be employed to accomplish this step. One example of such using high pressure laminate is the coating of the fiberboard core with an adhesive, mating the laminate layers to the adhesive coated substrate and then subjecting the mated materials to heat and pressure to cure such adhesive. Once the large sheets of material have been bonded, they are cut into plank or tile shaped panels 20. This step is represented by block 60. Subsequently, as represented by block 62, features may also be formed in the exemplary 20 in a plank cutting or forming station. Particularly, latching and securing portions 32 and 34 may be carved into the exemplary panels 20. Artisans in the flooring industry appreciate that the plank cutting station may be a device comprising any number of cutting tools configured to form the desired profiles in batch or continuous processes. Advantageously, the plank cutting station may receive the laminate flooring to cut and form panels as desired.

Figure 5:
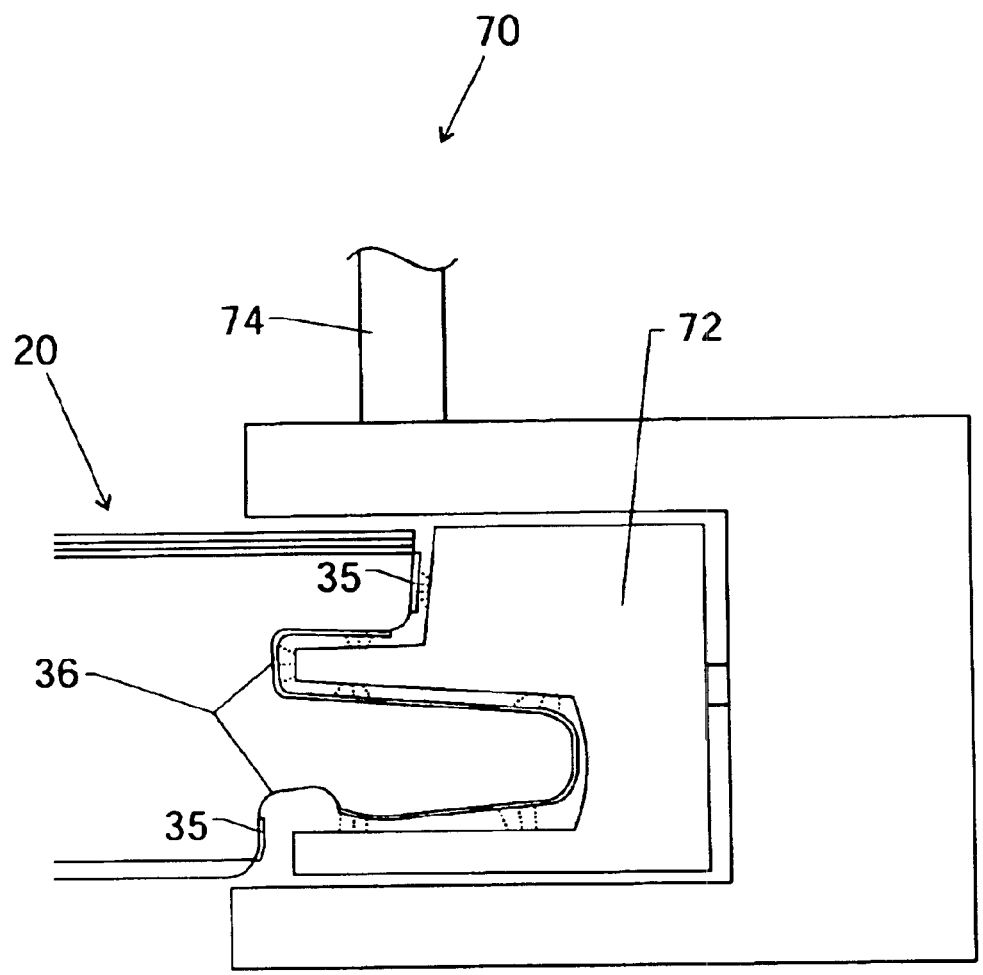
FIG. 5 is a depiction of an exemplary coating system, the depiction illustrating a spray head having a profile which matches the profile of an exemplary floor panel.

Block 64 represents the next step in the described process in which the coating 36 and sealant 35 may be applied to the appropriate segments of the latching and securing portions 32 and 34. As discussed in further detail below, the sealant 35 and the coating 36 may be applied in spray form by a coating system 70 (FIG. 5). For example, the sealant 35 and coating 36 may be sprayed onto the appropriate portions while in wet state either in the same or successive steps. During transition from the wet state to a final or preassembled state, the coating 36 dries on and adhesively bonds to the panel member 20. Once the coating 36 and sealant 35 have been applied, the panel members 20 are ready for shipping and installation. This step is represented by block 66.

As represented by block 68, the installer may then position adjacent panels 20 onto the floor at the point of installation. It may be necessary for the installer to cut panel members 20 to any number of lengths and shapes in order to fit the particular needs and configuration of the job site.

Additionally, the installer may level the floor using conventional leveling techniques to facilitate installation. Once adjacent floor panels 20 are properly positioned, the installer may then join the two corresponding panels 20 by simply forcing (i.e. snapping) the two panels 20 into engagement with one another. Because the surface of coating 36 is not tacky, and remains smooth following initial contact of the panels with one another, the installer can easily engage the panels 20 and adjust them laterally to accommodate misalignment that may occur in initial engagement.

As discussed above, the exemplary coating 36 begins to cohesively bond under ambient conditions. Accordingly, the installer need not activate the coating by re-wetting the coating, subjecting the coating to a heat or an ultra-violet light source, or applying extra pressure to the coating. Advantageously, the installer may achieve significantly reduced installation times in comparison to traditional glued floors. Moreover, the customer acquires advantages of a strongly bonded floor in comparison to purely mechanically secured floors. Once fully installed and given a relatively short time to cure, the customer may then enjoy the appearance of a natural wood or stone floor with the increased durability provided from the laminate surface It should be noted, however, that the use of the adhesive coating in conjunction with an interlocking profile is desireable in the present technique as the high bond strength ultimately provided by the adhesive coating is not instant.

Turning next to FIG. 5, an exemplary coating system 70 for applying the coating 36 and sealant 35 to the respective panel members 20 is illustrated. The exemplary system 70 comprises a vacuum coating system which applies the coating 36 and/or sealant 35 to the latching and securing portions of a panel 20. It should be noted that, in practice, the application of the coating and the sealant may be performed in separate operations, as by specifically-designed spraying equipment in a manufacturing line. Moreover, the coating and sealant need not be applied simultaneously, and it may be preferable to apply the coating before the sealant to permit proper adhesion of the coating to the substrate, uninhibited by the sealant, and to permit greater time for adhesion and drying of the applied coating. Those of ordinary skill in the art appreciate such systems 70 and note their availability. For example, such systems 70 are available from Schiele Maschinenbau GmbH of Niederzissen, Germany. In the described system 70, the coating 36 and/or the sealant 35 may be fed into spray head 72 by a set of conduits 74. Under pressure, the coating 36 and sealant 35 may be routed into the spray heads 72 and subsequently driven, in spray form, out of the heads 72 via a series of apertures (not shown). Advantageously, an even layer of the coating 36 and/or sealant 35 may be achieved. Moreover, the spray head 72 may be profiled as a form only a few millimeters in tolerance to the profile of the respective latching or securing portion 32 and 34. Accordingly, as the panel 20 is guided along the head 72, the head 72 may eddy the exemplary coating 36 and sealant 35 into a fine mist and, as such, allow the coating 36 and sealant 35 to settle safely and homogeneously onto the respective portions 32 and 34. The system 70, by maintaining good tolerances with the panels 20, limits the amount of coating 36 and sealant 35 wasted during the application process.

While the invention may be susceptible to various modifications and alternative forms, specific embodiments have been shown by way of example in the drawings and have been described in detail herein. However, it should be understood that the invention is not intended to be limited to the particular forms disclosed. Indeed, the present invention may also have application, for example, in non-laminate solid hardwood flooring. Moreover, the invention is to cover all modifications, equivalents, and alternatives falling within the spirit and scope of the invention as defined by the following appended claims.

What is claimed is:

1. A floor system, comprising:

first and second layered members, each layered member comprising a surface layer; and a core layer coupled to the surface layer, wherein the core layer comprises an integral latching portion disposed on a first side of the core layer and an integral securing portion disposed on a second side of the core layer, the latching and securing portions being configured to mate interlockingly with respect to one another;

an adhesive coating disposed on at least one of the latching and securing portions of the respective first and second layered members, wherein the adhesive coating comprises a polyvinyl acetate that coheres without rewetting; and a sealant disposed to at least one of the latching and securing portions of the respective first and second layered members to inhibit the ingress of moisture.

2. The floor system as recited in claim 1, wherein the adhesive coating is applied to both the latching and securing portions of the first and second layered members.

3. The floor system as recited in claim 2, wherein the adhesive coating adhesively bonds to the respective first and second layered members.

4. The floor system as recited in claim 3, wherein the adhesive coating on the first layered member cohesively bonds to the adhesive coating on the second layered member subsequent to engagement of corresponding latching and securing portions.

5. The floor system as recited in claim 4, wherein the adhesive coating cohesively bonds by contact under ambient conditions without activation.

6. The floor system as recited in claim 1, wherein the sealant is disposed at least along lengths of the latching and securing portions of the respective first and second layered members along which the adhesive coating is disposed.

7. The floor system as recited in claim 6, wherein the sealant is disposed between the adhesive coating and an upper or lower surface of the layered members.

8. The floor system as recited in claim 1, wherein the adhesive coating is applied during manufacture.

9. The floor system as recited in claim 1, wherein in the core layer comprises a wood/resin composite.

10. The floor system as recited in claim 1, wherein the surface layer comprises a laminate layer.

11. The floor system as recited in claim 1, wherein the adhesive coating has a substantially non-tacky surface and is adhesively bonded to the respective latching and securing portions.

12. The floor system as recited in claim 1, wherein the adhesive coating is adapted to provide a sliding interface between the latching and securing portions upon initial engagement of the first and second layered members.

13. The floor system as recited in claim 1, wherein the adhesive coating is adapted to facilitate positional adjustment of the layered members with respect to one another upon initial engagement of the first and second layered members.

14. The floor system as recited in claim 1, wherein the sealant is disposed at least adjacent to an upper surface of the first and second layered members.

15. A floor system comprising:

first and second members, each member comprising a latching portion coupled to the member, the latching portion having a substantially non-tacky coating adhesively bonded thereto, and a securing portion coupled to the member, the securing portion having the substantially non-tacky coating adhesively bonded thereto, the latching and securing portions further having a sealant applied thereto at least adjacent to an upper or lower surface of the respective member;

wherein the latching portion of the first member is adapted to couple interlockingly with the securing portion of the second member;

wherein the coating disposed on the first member and the coating disposed on the second member cohesively bond subsequent to engagement of the corresponding latching and securing portions; and wherein the sealant inhibits the ingress of moisture between the members when they are joined.

16. The floor system as recited in claim 15, wherein the coating comprises polyvinyl acetate that coheres without rewetting.

17. The floor system as recited in claim 15, wherein the first and second members each comprise a plurality of layers.

18. The floor system as recited in claim 17, wherein the plurality of layers comprises a core layer.

19. The floor system as recited in claim 18, wherein the plurality of layers comprises a decorative sheet.

20. The floor system as recited in claim 19, wherein the core layer comprises a wood/resin composite.

21. The floor system as recited in claim 15, wherein the coating and sealant are disposed over a substantial length of the latching portion of at least one of the respective first and second members.

22. The floor system as recited in claim 21, wherein the sealant is disposed on an unmated segment between the corresponding latching and securing portions.

23. The floor system as recited in claim 15, wherein the coating is adapted to provide a sliding interface between the corresponding latching and securing portions during initial engagement thereof.

24. The floor system as recited in claim 15, wherein the coating facilitates lateral movement of the members with respect to one another upon initial engagement of the latching portion with the securing portion.

25. A floor system, comprising:

first and second layered members, each layered member comprising a surface layer; and a core layer coupled to the surface layer, wherein the core layer comprises an integral latching portion disposed on a first side of the core layer and an integral securing portion disposed on a second side of the core layer, the latching and securing portions being configured to mate interlockingly with respect to one another;

a substantially non-tacky PVA coating that coheres without rewetting, adhesively bonded to the latching and securing portions of the respective first and second layered members, wherein the coating of the first layered member cohesively bonds to the coating of the second layered member subsequent to engagement of corresponding the latching and securing portions by contact under ambient conditions without activation; and a sealant applied to the latching and securing portions of the respective first and second layered members at least between an upper surface thereof and the coating to inhibit the ingress of moisture between the members when joined.

26. The floor system as recited in claim 25, wherein in the core layer comprises a wood/resin composite.

27. The floor system as recited in claim 25, wherein the surface layer comprises a laminate layer.

28. A floor system, comprising:

first and second layered members, each layered member comprising a surface layer; and a core layer coupled to the surface layer, wherein the core layer comprises an integral latching portion disposed on a first side of the core layer and an integral securing portion disposed on a second side of the core layer, the latching and securing portions being configured to mate interlockingly with respect to one another; and an adhesive coating disposed on a latching portion, a securing portion, or a combination thereof of the respective first and second layered members, wherein the adhesive coating comprises a polyvinyl acetate that coheres without rewetting.

29. The floor system as recited in claim 28, wherein the adhesive coating comprises a polyvinyl acetate (PVA).

30. The floor system as recited in claim 28, wherein the adhesive coating is applied to both the latching and securing portions of the first and second layered members.

31. The floor system as recited in claim 28, wherein in the core layer comprises a wood/resin composite.

32. The floor system as recited in claim 28, wherein the surface layer comprises a laminate layer.

33. A floor system, comprising:

first and second layered members, each layered member comprising a surface layer; and a core layer coupled to the surface layer, wherein the core layer comprises an integral latching portion disposed on a first side of the core layer and an integral securing portion disposed on a second side of the core layer, the latching and securing portions being configured to mate interlockingly with respect to one another; and an adhesive coating disposed on a latching portion, a securing portion, or a combination thereof of the respective first and second layered members, wherein the adhesive coating comprises a polyvinyl acetate that coheres without activation.

34. The floor system as recited in claim 33, wherein the adhesive coating is applied to both the latching and securing portions of the first and second layered members.

* * * * *